US012583959B2

(12) United States Patent
Cui et al.

(10) Patent No.: US 12,583,959 B2
(45) Date of Patent: Mar. 24, 2026

(54) COPOLYMER ADDITIVE

(71) Applicants: Dow Global Technologies LLC, Midland, MI (US); Rohm and Haas Company, Collegeville, PA (US)

(72) Inventors: Longlan Cui, Shanghai (CN); Shaoguang Feng, Shanghai (CN); Rui Wang, Shanghai (CN); Jieying Chen, Shanghai (CN); James C. Bohling, Lansdale, PA (US); Alvin M. Maurice, Lansdale, PA (US); Chen Chen, Shanghai (CN); Xiuqing Xu, Shanghai (CN)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 477 days.

(21) Appl. No.: 18/265,888

(22) PCT Filed: Jan. 25, 2021

(86) PCT No.: PCT/CN2021/073543

§ 371 (c)(1),
(2) Date: Jun. 7, 2023

(87) PCT Pub. No.: WO2022/155946

PCT Pub. Date: Jul. 28, 2022

(65) Prior Publication Data

US 2025/0059309 A1 Feb. 20, 2025

(51) Int. Cl.

*C09D 7/65* (2018.01)
*C08F 220/34* (2006.01)
*C09D 133/12* (2006.01)

(52) U.S. Cl.

CPC ............ *C08F 220/346* (2020.02); *C09D 7/65* (2018.01); *C09D 133/12* (2013.01)

(58) Field of Classification Search

CPC .......... C08F 220/346; C08F 2/10; C08F 2/26; C08F 220/36; C08F 2800/20; C08F 2810/50; C08F 8/44; C08F 220/14; C09D 7/65; C09D 133/12; C09D 5/024; C09D 7/48; C09D 133/14

See application file for complete search history.

(56) References Cited

U.S. PATENT DOCUMENTS

2007/0238827 A1* 10/2007 Brady .................. C09D 133/08 524/556
2008/0139737 A1 6/2008 Alderfer et al.
2020/0369809 A1* 11/2020 Wei ........................ C08F 257/02

FOREIGN PATENT DOCUMENTS

| | | |
|---|---|---|
| CN | 102199254 | 9/2011 |
| CN | 105086892 | 11/2015 |
| CN | 105367698 | 3/2016 |
| EP | 13147 | 7/1980 |
| WO | 2015110403 | 7/2015 |

OTHER PUBLICATIONS

Brandrup, "Polymer Handbook", Interscience Publishers.
Fox, Bull. Am. Physics Soc., 1956, vol. 1, No. 3, p. 123.
Search Report and Written Opinion from corresponding International Application No. PCT/CN2021/073543.

* cited by examiner

*Primary Examiner* — Kumar R Bhushan

(74) *Attorney, Agent, or Firm* — CANTOR COLBURN LLP

(57) ABSTRACT

A copolymer additive comprising water and a copolymer prepared from an acetoacetamide functional monomer and a ureido monomer is stable in a wide range of pH values and a coating composition comprising such copolymer additive can provide coating films made therefrom with good formaldehyde abatement performance and good resistance to yellowing.

11 Claims, No Drawings

COPOLYMER ADDITIVE

FIELD OF THE INVENTION

The present invention relates to a copolymer additive and a coating composition comprising the same.

INTRODUCTION

Aqueous compositions also known as waterborne compositions are becoming increasingly more important than solvent-based compositions for less environmental problems. There are increasingly strict environmental regulations with respect to reduce health risks from indoor exposure to air pollutants such as formaldehyde, for example, China indoor air purification standard JC/T 1074-2008 requires architecture interior coatings with formaldehyde abatement efficiency of at least 75%. Attempts have been made to reduce free formaldehyde released from the indoor environment. For example, aqueous acetoacetoxy-group-containing polymer binders have been developed as formaldehyde abatement materials for coating applications. However, hydrolysis of the acetoacetoxy groups in the polymer tends to occur in water during storage, which can cause a buildup of pressure in containers resulting in safety issues. One of the effective ways to avoid serious hydrolysis is to protect acetoacetoxy group by using some selective organic amines, such as ethanolamine, but coating films comprising the acetoacetoxy functional polymer and the amine tend to show discoloration (e.g., yellowing) over time, when exposed to sunlight, particularly upon aging of the coating films.

It is desirable to discover an additive suitable for coating compositions without the aforementioned problems.

SUMMARY OF THE INVENTION

The present invention solves the problem of discovering a copolymer additive without the aforementioned problems. The copolymer additive of the present invention comprises a copolymer prepared from polymerization of a novel combination of an acetoacetamide functional monomer and a ureido monomer. The copolymer additive of the present invention is more stable in a wide range of pH values (e.g., from 2 to 10), as compared with similar copolymer additives containing structural units of an acetoacetoxy functional monomer instead of the acetoacetamide functional monomer. A coating composition comprising the copolymer additive of the present invention can provide coating films made therefrom with less yellowing than similar coating compositions containing acetoacetoxy functional binder. These properties can be measured according to the test methods described in the Examples section below.

In a first aspect, the present invention is a copolymer additive comprising a copolymer having a weight average molecular weight of from 1,000 to 10,000 grams per mole (g/mol) and water, wherein the copolymer comprises, by weight based on the weight of the copolymer, from 4% to 60% of structural units of an acetoacetamide functional monomer having the structure of formula (I):

(I)

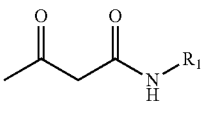

wherein $R_1$ is selected from the following structure:

(II-a)

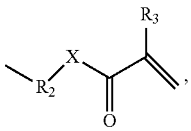

(II-b)

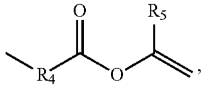

(II-c)

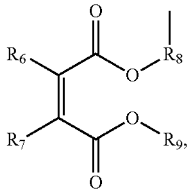

(II-d)

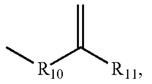

or (II-e)

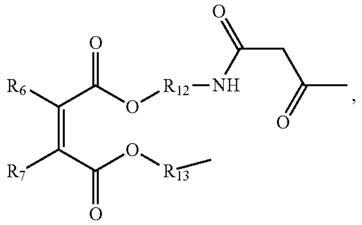

where $R_2$, $R_4$, $R_8$, $R_{10}$, $R_{12}$ and $R_{13}$ are each independently an alkylene group having 2 to 20 carbon atoms, $R_3$, $R_5$, $R_6$, $R_7$ and $R_{11}$ are each independently hydrogen or an alkyl group having from 1 to 8 carbon atoms, $R_9$ is hydrogen or an alkyl group having 1 to 20 carbon atoms, and X is —O— or —N—; and from 40% to 96% of structural units of a ureido monomer.

In a second aspect, the present invention is a coating composition comprising:

a binder having a weight average molecular weight of 100,000 g/mol or more, and from 0.08% to 3% by dry weight of the copolymer additive of the first aspect, based on the total weight of the coating composition.

DETAILED DESCRIPTION OF THE INVENTION

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, or mixtures thereof.

Throughout this document, the word fragment "(meth) acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" as used herein can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_2)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

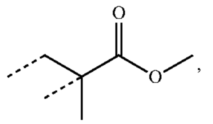

where the dotted lines represent the points of attachment of the structural unit to the polymer backbone.

The copolymer additive of the present invention comprises structural units of one or more acetoacetamide functional monomer. The acetoacetamide functional monomer refers to a monomer containing at least one acetoacetamide group. The acetoacetamide functional monomer useful in the present invention has the structure of formula (I):

(I)

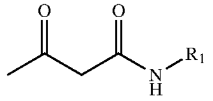

wherein $R_1$ is selected from the following structure:

(II-a)

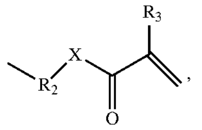

(II-b)

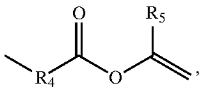

-continued (II-c)

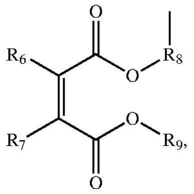

(II-d)

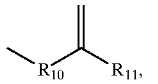

or (II-e)

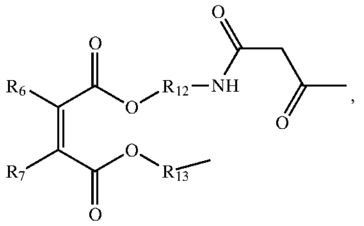

where $R_2$, $R_4$, $R_8$, $R_{10}$, $R_{12}$ and $R_{13}$ are each independently an alkylene group, having 2 to 20 carbon atoms, from 3 to 12 carbon atoms, or from 4 to 8 carbon atoms, such as ethylene group ($-CH_2CH_2-$) and propylene group ($-CH_2CH_2CH_2-$); $R_3$, $R_5$, $R_6$, $R_7$, and $R_{11}$ are each independently hydrogen (H) or an alkyl group having from 1 to 8 carbon atoms or from 2 to 4 carbon atoms, such as methyl and ethyl; $R_9$ is H or an alkyl group having 1 to 20 carbon atoms, from 3 to 12 carbon atoms, or from 4 to 8 carbon atoms; and X is —O— or —N—. Preferably, $R_1$ has the structure of (II-a), wherein X is —O—, $R_2$ is $-CH_2CH_2-$, and $R_3$ is $-CH_3$. "Alkyl" refers to a monovalent saturated hydrocarbon group, such as methyl. "Alkylene" refers to a bivalent saturated aliphatic radical such as $-CH_2CH_2-$.

The acetoacetamide functional monomer can be an acetoacetamidoalkyl (meth)acrylate. Examples of suitable acetoacetamide functional monomers include acetoacetamidoethyl methacrylate (N-AAEM), acetoacetamidoethyl acrylate, acetoacetamidoethyl (meth)acrylamide, acetoacetamidoethyl maleate, acetoacetamidoethyl itaconate, or mixtures thereof. Preferably, the acetoacetamide functional monomer is acetoacetamidoethyl methacrylate.

The acetoacetamide functional monomer useful in the present invention may be synthesized by reacting N-(2-hydroxyethyl) acetoacetamide with an ethylenically unsaturated ionic monomer (e.g., carboxylic acid monomers) described below, an alkyl ester of (meth)acrylic acid, or mixtures thereof; through esterification or transesterification reaction. Alkyl ester of (meth)acrylic acids useful in the present invention can be C1-C20-, C1-C10-, or C1-C8-alkyl esters of (meth)acrylic acids including, for example, methyl acrylate, methyl methacrylate, ethyl acrylate, butyl acrylate, butyl methacrylate, 2-ethylhexyl acrylate, iso-butyl (meth) acrylate, hexyl (meth)acrylate, lauryl (meth)acrylate, stearyl (meth)acrylate, cyclohexyl (meth)acrylate, benzyl (meth) acrylate, oleyl (meth)acrylate, palmityl (meth)acrylate, nonyl(meth)acrylate, decyl (meth)acrylate, dodecyl (meth)acrylate, pentadecyl (meth)acrylate, hexadecyl (meth)acrylate, octadecyl (meth)acrylate, hydroxyethyl (meth)acrylate, or hydroxypropyl (meth)acrylate, or mixtures thereof. Preferably, the ethylenically unsaturated ionic monomer is an anhydride of carboxylic acid monomers described below. More preferably, (meth)acrylate anhydride is used to react with N-(2-hydroxyethyl) acetoacetamide.

The copolymer in the copolymer additive of the present invention may comprise, by weight based on the weight of the copolymer, structural units of the acetoacetamide functional monomer in an amount of 4% or more, 5% or more, 7% or more, 8% or more, 9% or more, 10% or more, 11% or more, 12% or more, 13% or more, 14% or more, or even 15% or more, and at the same time, 60% or less, 55% or less, 50% or less, 45% or less, 40% or less, 35% or less, 32% or less, 30% or less, 28% or less, 25% or less, 22% or less, or even 20% or less.

The copolymer in the copolymer additive of the present invention comprises structural units of one or more ureido monomer. As used herein, the term "ureido monomer" refers to an ethylenically unsaturated compound containing one or more cyclic ureido group (i.e., an imidazolidin-2-one group). The ureido monomer may comprise a (meth)acrylate group, a vinyl group, or a (meth)acrylamido group. Suitable ureido monomers may include, for example,

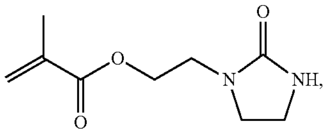,

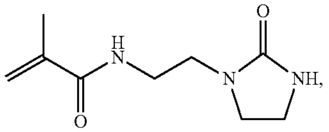,

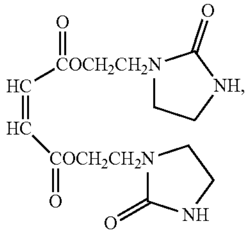,

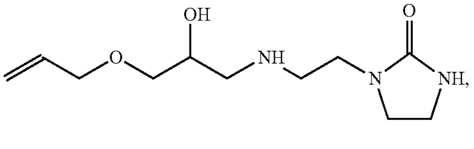, or mixtures thereof.

The copolymer in the copolymer additive of the present invention may comprise, by weight based on the weight of the copolymer, structural units of the ureido monomer in an amount 40% or more, 45% or more, 50% or more, 55% or more, 60% or more, 65% or more, 68% or more, 70% or more, 72% or more, 75% or more, or even 78% or more, and at the same time, 96% or less, 95% or less, 93% or less, 92% or less, 91% or less, 90% or less, 89% or less, 88% or less, 87% or less, 86% or less, or even 85% or less.

The copolymer in the copolymer additive of the present invention may optionally comprise one or more ethylenically unsaturated ionic monomer. The term "ionic monomer" herein refers to a monomer that bears an ionic charge between pH=1-14. The ethylenically unsaturated ionic monomers may include carboxylic acid monomers, phosphorous-containing acid monomers, sulfonic acid monomers, sulfate monomers; salts thereof; or mixtures thereof. The carboxylic acid monomers can be α,β-ethylenically unsaturated carboxylic acids, monomers bearing an acid-forming group which yields or is subsequently convertible to, such an acid group (such as anhydride, (meth)acrylic anhydride, or maleic anhydride); or mixtures thereof. Specific examples of carboxylic acid monomers include acrylic acid, methacrylic acid, maleic acid, itaconic acid, crotonic acid, fumaric acid, or mixtures thereof. The sulfonic acid monomers and salts thereof may include sodium vinyl sulfonate (SVS), sodium styrene sulfonate (SSS), acrylamido-methyl-propane sulfonate (AMPS), or mixtures thereof. one or more phosphorus-containing acid monomer, a salt thereof, or mixtures thereof. Suitable phosphorous-containing acid monomers and salts thereof may include phosphoalkyl (meth)acrylates such as phosphoethyl (meth) acrylate, phosphopropyl (meth)acrylate, phosphobutyl (meth)acrylate, salts thereof, and mixtures thereof; $CH_2{=}C(R_1){-}C(O){-}O{-}(R_2O)_q{-}P(O)(OH)_2$, wherein $R_1$=H or $CH_3$, $R_2$=alkylene, such as an ethylene group, a propylene group, a butylene group, or a combination thereof; and q=1-20, such as SIPOMER PAM-100, SIPOMER PAM-200, SIPOMER PAM-300, SIPOMER PAM-600 and SIPOMER PAM-4000 all available from Solvay; phosphoalkoxy (meth) acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomer is phosphoethyl methacrylate (PEM). The copolymer in the copolymer additive may comprise, by weight based on the weight of the copolymer, structural units of the ethylenically unsaturated ionic monomer in an amount of zero or more, 0.05% or more, 0.1% or more, 1% or more, 2% or more, or even 3% or more, and at the same time, 35% or less, 30% or less, 25% or less, 20% or less, 18% or less, 15% or less, 10% or less, or even 5% or less.

The copolymer in the copolymer additive of the present invention may optionally comprise structural units of one or more ethylenically unsaturated nonionic monomer that is other than the acetoacetamide functional monomer and the ureido monomer. The term "nonionic monomer" herein refers to a monomer that does not bear an ionic charge between pH=1-14. The nonionic monomer may be selected from the group consisting of hydroxy-functional alkyl (meth)acrylates; (meth)acrylamide; diacetone (meth)acrylamide; vinyltrialkoxysilanes, (meth)acryl functional silanes; glycidyl (meth)acrylate, or combinations thereof. Suitable hydroxy-functional alkyl (meth)acrylates include, for example, hydroxyethyl (meth)acrylate, hydroxypropyl (meth)acrylate or mixtures thereof. Examples of suitable vinyltrialkoxysilanes include vinyltrimethoxysilane, vinyltriethoxysilane, and vinyltris (2-methoxyethoxy) silane, vinyldimethylethoxysilane, and vinylmethyldiethoxysilane, or mixtures thereof. Examples of suitable (meth)acryl functional silanes include (meth)acryloxyalkyltrialkoxysilanes such as gamma-methacryloxypropyltrimethoxysilane and methacryloxypropyltricthoxysilane; 3-methacryloxypropylmethyldimethoxysilane; 3-methacryloxypropyltrimethoxysilane; 3-methacryloxypropyltriethoxysilane; or mixtures thereof. The copolymer may comprise, by weight based on the weight of the copolymer, zero or more, 0.05% or more, 0.1% or more, 1% or more, or even 3% or more, and at the same time, 18% or less, 15% or more, 10% or less, or even 5% or less, of structural units of the ethylenically unsaturated nonionic monomer. Total weight concentration of structural units of the above monomers may be 100%.

Preferably, the copolymer in the copolymer additive comprises, by weight based on the weight of the copolymer, from 4% to 60% of structural units of the acetoacetamide functional monomer and from 40% to 96% of structural units of the ureido monomer, more preferably, from 8% to 25% of structural units of the acetoacetamide functional monomer and from 75% to 92% of structural units of the ureido monomer; and from zero to 18% of structural units of the ethylenically unsaturated ionic monomer; and from zero to 18% of structural units of the ethylenically unsaturated nonionic monomer. More preferably, the total weight concentration of structural units of the acetoacetamide functional monomer and the ureido monomer is 100%.

The copolymer in the copolymer additive of the present invention may have a weight average molecular weight (Mw) in the range of 1,000 grams per mole (g/mol) or more, 1,200 g/mol or more, 1,500 g/mol or more, 1,800 g/mol or more, 2,000 g/mol or more, 2,200 g/mol or more, 2,500 g/mol or more, 2,800 g/mol or more, 3,000 g/mol or more, or even 3,200 g/mol or more, and at the same time, 10,000 g/mol or less, 9,800 g/mol or less, 9,500 g/mol or less, 9,200 g/mol or less, 9,000 g/mol or less, 8,800 g/mol or less, 8,500 g/mol or less, 8,200 g/mol or less, 8,000 g/mol or less, 7,800 g/mol or less, 7,500 g/mol or less, 7,200 g/mol or less, 7,000 g/mol or less, 6,800 g/mol or less, 6,500 g/mol or less, 6,200 g/mol or less, 6,000 g/mol or less, or even 5,900 g/mol or less. $M_w$ may be determined by Gel Permeation Chromatography (GPC) analysis as described in the Examples section below.

The copolymer additive of the present invention may be prepared by solution polymerization of the monomers described above. Total weight concentration of the monomers used for preparing the copolymer is equal to 100%. The monomers may be added neat or as a solution in water; or added in one or more additions or continuously, linearly or nonlinearly, over the reaction period of preparing the copolymer additive. Temperature suitable for polymerization process may be lower than 100 degrees Celsius (° C.), in the range of from 30 to 95° C., or in the range of from 50 to 90° C.

The copolymer additive of the present invention also comprises water. Water is present in an amount to afford a desired solids content, for example, 10% or more, 15% or more, 20% or more, 25% or more, or even 30% or more, and at the same time, 60% or less, 55% or less, or even 50% or less, by weight based on the weight of the copolymer additive. Solids content may be measured according to the test method described in the Examples section below.

In the polymerization process of preparing the copolymer additive, free radical initiators and/or chain transfer agents may be used. The polymerization process may be thermally initiated or redox initiated free-radical polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0%, by weight based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, sodium hypophosphite, sodium bisulfite, sodium metabisulfite, phosphorous acid, isopropyl alcohol, sodium formate, or mixtures thereof. The chain transfer agent may be used in an effective amount to control the molecular weight of the copolymer, for example, from zero to 15%, from 0.1% to 12%, from 0.15% to 10%, or from 0.2% to 8% by weight based on the total weight of monomers used for preparing the copolymer.

After completing the polymerization, the obtained copolymer additive may be neutralized to a pH value, for example, 2 or higher, 3 or higher, 4 or higher, 5 or higher, 6 or higher, or even 7 or higher, and at the same time, 10 or less, 9.5 or less, 9 or less, or even 8.5 or less. Examples of suitable neutralizers include ammonia, 2-Amino-2-methyl-1-propanol (AMP-95), ethanolamine (MEA), diethanolamine, 2-Dimethylaminoethanol, sodium hydroxide (NaOH), potassium hydroxide (KOH), Jeffamine D-230 polyetheramines available from Huntsman, or mixtures thereof. The obtained copolymer is typically soluble in water at temperatures in the range of from 15 to 30° C.

The copolymer additive of the present invention is more stable (i.e., showing less hydrolysis) in a wide range of pH values above (e.g., from 2 to 10), compared with similar copolymer additives containing structural units of an acetoacetoxy functional monomer (e.g., acetoacetoxyethyl (meth)acrylate) instead of the acetoacetamide functional monomer. For example, the copolymer additive of the present invention shows a delta acetone level of less than 400 parts per million (ppm), less than 380 ppm, less than 350 ppm, less than 320 ppm, less than 300 ppm, less than 200 ppm, or even less than 100 ppm, by weight based on the weight of the copolymer additive, after heat aging at 80° C. for 1 day, according to the test method described in the Examples section below.

The present invention also relates to a coating composition comprising the copolymer additive and one or more binder. The copolymer additive may be present in the coating composition in an amount of 0.08% or more, 0.09% or more, 0.1% or more, 0.12% or more, 0.14% or more, 0.15% or more, 0.18% or more, or even 0.2% or more, and at the same time, 3% or less. 2.8% or less, 2.5% or less, 2.2% or less, 2% or less, 1.8% or less, 1.5% or less, 1.2% or less, 1% or less, or even 0.8% or less, by dry weight based on the total weight of the coating composition. Preferably, the coating composition comprise, by weight based on the total weight of the coating composition, structural units of the acetoacetamide functional monomer in an amount of 0.04% or more, 0.05% or more, 0.06% or more, 0.07% or more, or even 0.08% or more, and at the same time, 0.4% or less, 0.38% or less, 0.35% or less, 0.32% or less, 0.3% or less, 0.28% or less, 0.25% or less, 0.22% or less, 0.2% or less, 0.18% or less, 0.15% or less, 0.14% or less, 0.12% or less, or even 0.11% or less.

The coating composition of the present invention further comprises one or more binder typically supplied in the form of an aqueous dispersion. The binder (also known as film-forming polymers) can be an emulsion polymer. The binder may comprise an acrylic polymer. "Acrylic polymer" herein refers to a homopolymer of an acrylic monomer or a copolymer of an acrylic monomer with a different acrylic monomer or other monomers such as styrene, substituted styrene, and vinyl acetate. The acrylic polymer can be an acrylic homopolymer, a styrene-acrylic copolymer, a vinyl acetate-acrylic copolymer, or mixtures thereof. "Acrylic monomer" as used herein includes (meth)acrylic acid, alkyl (meth)acrylate, (meth)acrylamide, (meth)acrylonitrile and their modified forms such as hydroxyalkyl (meth)acrylate.

The binder in the coating composition of the present invention may comprise structural units of one or more ethylenically unsaturated ionic monomer and structural units of one or more ethylenically unsaturated nonionic monomer. Suitable ethylenically unsaturated ionic monomer herein may include those described in the copolymer additive section above such as (meth)acrylic acid. The binder may comprise, by weight based on the weight of the binder, from 0.1% to 15% of structural units of the ethylenically unsaturated ionic monomer, for example, from 0.1% to 10%, from 0.5% to 8%, from 1% to 6%, from 1.5% to 5%, or from 2% to 4%. Suitable ethylenically unsaturated nonionic monomers herein include those nonionic monomers described in the copolymer additive section above such as meth (meth) acrylate, butyl (meth)acrylate, styrene, vinyl acetate, ethyl acrylate, lauryl methacrylate, 2-hydroxyethyl methacrylate, or mixtures thereof. The binder may comprise, by weight based on the dry weight of the binder, from 85% to 99.9%, from 90% to 99.9%, from 92% to 99.5%, from 93% to 99%, from 95% to 98.5%, or from 96% to 98% of structural units of the monoethylenically unsaturated nonionic monomer. The binder may optionally comprise structural units of one or more multiethylenically unsaturated nonionic monomer including di-, tri-, tetra-, or higher multifunctional ethylenically unsaturated monomers. Examples of suitable multiethylenically unsaturated monomers include butadiene, allyl (meth)acrylate, divinyl benzene, ethylene glycol dimethacrylate, butylene glycol dimethacrylate, or mixtures thereof. The binder may comprise, by weight based on the dry weight of the binder, from zero to 5%, from 0.1% to 3%, or from 0.5% to 1.5% of structural units of the multiethylenically unsaturated nonionic monomer. The binder in the coating composition may comprise or be free of (that is, have an absence of) structural units of an acetoacetoxy functional monomer such as acetoacetoxyethyl methacrylate, for example, the binder may comprise structural units of the acetoacetoxy functional monomer in an amount of less than 1.5%, less than 1.2%, less than 1%, less than 0.8%, less than 0.5%, less than 0.1%, or even zero, by weight based on the dry weight of the binder.

The binder in the coating composition of the present invention may have a $T_g$ of from −15 to 50° C., from −10 to 30° C., or from −5 to 10° C. as calculated by the Fox equation above. The binder useful in the present invention may have a weight average molecular weight (Mw) of 100,000 g/mol or more, 110,000 g/mol or more, 120,000 g/mol or more, 140,000 g/mol or more, 150,000 g/mol or more, 160,000 g/mol or more, 180,000 g/mol or more, 200,000 g/mol or more, 300,000 g/mol or more, 400,000 g/mol or more, 500,000 g/mol or more, 600,000 g/mol or more, 700,000 g/mol or more, 800,000 g/mol or more, 1,000,000 g/mol or more, or even 1,200,000 g/mol or more. $M_w$ may be determined by GPC analysis as described in the Examples section below.

The binder in the coating composition of the present invention may have a minimum film formation temperature (MFFT) in the range of from −10 to 70° C., from 10 to 60° C., or from 20 to 55° C., as determined according to ASTM D 2354-10 (2018). The binder particles in the coating composition of the present invention may have a particle size of from 50 nanometers (nm) to 500 nm, from 80 nm to 200 nm, or from 90 nm to 150 nm. The particle size herein refers to Z-average size and may be measured by a Brookhaven BI-90 Plus Particle Size Analyzer.

The coating composition of the present invention may comprise one or more pigment. "Pigment" herein refers to a particulate inorganic material which is capable of materially contributing to the opacity or hiding capability of a coating. Such materials typically have a refractive index greater than 1.8. Inorganic pigments may include, for example, titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. $TiO_2$ may be also available in concentrated dispersion form.

The coating composition of the present invention may comprise one or more extender. The term "extender" herein refers to a particulate inorganic material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof. The coating composition may have a pigment volume concentration (PVC) of 15% or more, 20% or more, 25% or more, 30% or more, or even 35% or more, and at the same time, 90% or less, 88% or less, 85% or less, 70% or less, or even 60% or less. PVC may be determined by the equation: $PVC=[Volume_{(Pigment+Extender)}/Dry\ volume_{(Pigment+Extender+Binder)}]\times 100\%$.

The coating composition of the present invention may comprise one or more defoamer. The term "defoamer" herein refer to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present, by weight based on the total weight of the coating composition, in an amount of from zero to 1%, from 0.05 to 0.8%, or from 0.1 to 0.5%.

The coating composition of the present invention may comprise one or more thickener. Thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydroxypropyl cellulose. Preferably, the thickener is a hydrophobically-modified hydroxy ethyl cellulose (HMHEC). The thickener may be present, by weight based on the total weight of the coating composition, in an amount of from zero to 5%, from 0.1% to 3%, or from 0.2% to 1%.

The coating composition of the present invention may comprise one or more wetting agent. The term “wetting agent” herein refers to a chemical additive that reduces the surface tension of a coating composition, causing the coating composition to more easily spread across or penetrate the surface of a substrate. Wetting agents may be polycarboxylates, anionic, zwitterionic, or non-ionic. The wetting agent may be present, by weight based on the total weight of the coating composition, in an amount of from zero 2.5%, from 0.5% to 2%, or from 1% to 1.5%.

The coating composition of the present invention may comprise one or more dispersant. Dispersants may include nonionic, anionic, or cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids (e.g., weight average molecular weight ranging from 1,000 to less than 50,000 as measured by GPC), including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The dispersant may be present, by weight based on the total weight of the coating composition, in an amount of from zero to 5%, from 0.2% to 3%, or from 0.3% to 2%.

The coating composition of the present invention may comprise one or more coalescent. The term “coalescent” herein refers to a slow-evaporating solvent that fuses polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present, by weight based on the total weight of the coating composition, in an amount of zero or more, 0.1% or more, 1% or more, or even 3% or more, and at the same time, 10% or less, 9% or less, or even 8% or less.

In addition to the components described above, the coating composition of the present invention may further comprise any one or combination of the following additives: buffers, neutralizers, photo crosslinkers, anti-freezing agents, humectants, mildewcides, biocides, anti-skinning agents, colorants, flowing agents, anti-oxidants, plasticizers, leveling agents, thixotropic agents, adhesion promoters, and grind vehicles. These additives may be present, by weight based on the total weight of the coating composition, in a combined amount of from zero to 10%, from 0.001% to 5%, from 1% to 4%, or from 2% to 3%.

The coating composition of the present invention may have a solids content of from 28% to 80%, from 40% to 70%, from 50% to 60%, by weight based on the total weight of the coating composition.

The coating composition of the present invention may be prepared by a process comprising: admixing the copolymer additive with the binder and other optional components, e.g., pigments and/or extenders as described above. Components in the coating composition may be mixed in any order to provide the coating composition of the present invention. Any of the above-mentioned optional components may also be added to the coating composition during or prior to the mixing to form the coating composition. When the coating composition comprises the pigment and/or extender, the pigments and/or extenders are preferably mixed with the dispersant to form a slurry of pigments and/or extender.

The coating composition of the present invention, typically an aqueous coating composition, is useful for removal of formaldehyde in various applications. The coating composition can provide good formaldehyde abatement properties to meet the requirement of JC/T 1074-2008 standard (China building materials industry standard for purificatory performance of coatings with air purification), as indicated by formaldehyde abatement (FA) efficiency of 75% or more, preferably, 78% or more, 80% or more, 85% or more, or even 90% or more.

The present invention also includes a method of removing aldehydes from air containing aldehydes with the coating composition of the present invention, comprising: applying the coating composition to a substrate; and drying, or allowing to dry, the applied aqueous coating composition to form a film (that is, coating). After the coating composition of the present invention has been applied to a substrate, the coating composition can dry at room temperature (15-35° C.) or at an elevated temperature, for example, from 35 to 80° C.

The coating composition of the present invention can also provide coating films made therefrom with less yellowness, as compared to similar coating compositions lacking the copolymer additive but containing acetoacetoxy functional binders. For example, the coating composition can provide the coating films with reduced or low yellowing, as indicated by delta b (Δb) less than 0.5 after heat aging at 50° C. for 7 days as determined according to the test method described in the Examples section below.

The coating composition of the present invention can be applied to, and adhered to, various substrates. Examples of suitable substrates include wood, metals, plastics, foams, stones, elastomeric substrates, glass, fabrics, concrete, or cementitious substrates. The coating composition, preferably comprising the pigment, is suitable for various applications such as marine and protective coatings, automotive coatings, traffic paint, Exterior Insulation and Finish Systems (EIFS), roof mastic, wood coatings, coil coatings, plastic coatings, powder coatings, can coatings, architectural coatings, and civil engineering coatings. The coating composition is particularly suitable for architectural coatings.

The coating composition of the present invention can be applied to a substrate by incumbent means including brushing, dipping, rolling and spraying, preferably by spraying. The standard spray techniques and equipment for spraying such as air-atomized spray, air spray, airless spray, high volume low pressure spray, and electrostatic spray such as electrostatic bell application, and either manual or automatic methods can be used.

EXAMPLES

Some embodiments of the invention will now be described in the following Examples, wherein all parts and percentages are by weight unless otherwise specified.

CELLOSIZE QP-15000-H hydroxyethyl cellulose, ROCIMA 363 and KATHON LXE biocides, and Ti-Pure R-706 ($TiO_2$) pigment are all available from The Dupont Company.

CC-700 extender ($CaCO_3$) is available from Guangfu Building Materials Group (China).

DB-80 extender (calcined clay) is available from Shanxi Jinyang Calcined Kaolin Ltd. (China).

Texanol coalescent is available from Eastman Chemical Company.

ECOSURF™ BD-109 non-ionic alcohol ethoxylate surfactant, OROTAN™ 1124 dispersant, 2-methyl-2-amino-propanol (AMP-95) used as a neutralizer, ROPAQUE™ Ultra E opaque polymer, and ACRYSOL™ RM-2020 NPR thickener are all available from The Dow Chemical Company (ECOSURF, OROTAN, ROPAQUE, and ACRYSOL are trademarks of The Dow Chemical Company).

(2-Acetoacetoxy) ethyl methacrylate monomer (AAEM) is available from Eastman Chemical Company.

Butyl acrylate (BA), 2-Ethylhexyl acrylate (EHA), methyl methacrylate (MMA), and methacrylic acid (MAA) are all available from Shanghai Lang Yuan Chemical Co., Ltd.

FOAMATER NXZ defoamer, DISPONIL FES 32 anionic surfactant (fatty alcohol ether sulfate), DISPONIL LDBS 20 surfactant (linear dodecyl benzene sulfonate), and MPEGMA 350 (methyl polyethylene glycol methacrylate) are all available from BASF Global Corporation.

RHODAFAC RS-610-A25 surfactant (branched alcohol ethoxylate based phosphate ester) is available from Solvay Company.

Methacrylate ethyl ethylene urea (MEEU), ammonium persulphate (APS), sodium bisulfite (SBS), ethanolamine (MEA), ethylenediaminetetraacetic acid (EDTA) sodium salt, sodium carbonate ($Na_2CO_3$), and ferrous sulfate ($FeSO_4 \cdot 7H_2O$) used as promoter are all available from Shanghai Chemical Reagent Co. Ltd.

The following standard analytical equipment and methods are used in the Examples and in determining the properties and characteristics stated herein:

GPC Analysis

GPC analysis was performed generally by Agilent 1200 (Agilent Technologies (China) Co. Ltd.) to determine molecular weights.

For measuring molecular weights of copolymer additives, a copolymer additive sample was dissolved in dimethylformamide (DMF)/2% formic acid (FA) (volume/volume) (v/v) at a concentration of 2 milligrams per millimeter (mg/mL). The resulting sample solution was left overnight and then filtered by a 0.45 μm polytetrafluoroethylene (PTFE) membrane before GPC analysis. The GPC analysis was conducted using the following conditions: One PSS GRAM guard column, two PSS GRAM linear columns (8.0×300 mm, 10 μm) in tandem; column temperature: 50° C.; mobile phase: DMF/2% FA (volume/volume); flow rate: 1.0 mL/minute (min); injection volume: 100 μL; detector: Agilent refractive index detector, 50° C.; and calibration curve: PL Polyethylglycol narrow standards with molecular weights ranging from 542500 to 1010 g/mol, using polynomic 3 fitness.

For measuring molecular weights of binders, a binder sample (Binder-1 or Binder-2) was dissolved in tetrahydrofuran (THF)/5% formic acid (FA) at a concentration of 3 mg/mL. The resulting sample solution was filtered by a 0.45 μm PTFE membrane before GPC analysis. The GPC analysis was conducted using the following conditions: One precolumn and two Mixed B columns (7.5×300 mm) in; column temperature: 35° C.; mobile phase: THF/5% FA; flow rate: 1.0 mL/min; injection volume: 50 μL; detector: Agilent refractive index detector, 35° C.; and calibration curve: PL Polystyrene (PS) narrow standards (Part No.: 2010-0101) with PS equivalent molecular weights ranging from 2329000 to 580 g/mol.

Solids Content

Solids content of a copolymer additive or binder sample was measured by weighting 0.7±0.1 g of the sample (wet weight of the sample is denoted as "W1"), putting the sample into an aluminum pan (weight of aluminum pan is denoted as "W2") in an oven at 150° C. for 25 min, and then cooling to room temperature and weighting the aluminum pan with the dried sample with the total weight denoted as "W3". "W3−W2" refers to dry or solids weight of the sample. Solids content is calculated by (W3−W2)/W1*100%.

Hydrolysis Stability of Copolymer Additive

Acetone level of a copolymer additive sample was used to characterize the hydrolysis degree of the sample. For each test sample, at least two vials of the sample were tested for comparison. One vial was placed at room temperature (15-35° C.) for 1 day, and then an initial acetone level was measured. Another vial was placed in an oven at 80° C. for heat aging for 1 day, and then the acetone level after heat aging was measured and recorded as final acetone level. For each test sample, two specimens were used and tested to give the average acetone levels. The absolute value difference between the initial acetone level and the final acetone level is defined as "delta acetone level", in part per million (ppm), by weight based on the weight of the copolymer additive. Acceptable delta acetone level is <400 ppm.

Both the initial acetone level and the final acetone level of the sample were measured by Headspace Gas Chromatography-Flame Ion Detector (GC-FID) as follows, The sample to be tested (2 g) was weighed and put into the GC vessel to run headspace GC to test the acetone concentration in the sample. The oven in the headspace (Agilent G1888 Headspace Sampler) was set at 40° C. (vial equilibration time: 60 min). GC-FID conditions were as follows: Instrument: Agilent 6890N Gas Chromatography system with DB-5 column (30 m×0.32 mm ID×1.0 μm film); Carrier flow: Helium carrier gas at 2.0 ml/min constant flow; Oven: 40° C., holding for 5 min, 15° C./min ramp to 250° C., holding for 0 min, total run time: 19 min; Inlet (Injector temp: 200° C., Split ratio: 5:1; Temperature: 250° C., $H_2$ flow: 40 mL/min, Air flow: 450 mL/min, and makeup flow: 45 mL/min).

Formaldehyde Abatement (FA) Efficiency

A coating composition was evaluated for FA efficiency properties according to JC/T 1074-2008 standard. FA efficiency requires 75% or higher (≥75%) after 24 hours to meet the requirement of JC/T 1074-2008. The higher FA efficiency, the better FA abatement performance.

Coating Film Yellowing Test

A coating composition was drawn down on a black-white charter using a 100 μm film caster and dried in the horizontal position for one day. The b value of the resulting coating film, denoted as "$b_{Initial}$", was tested using a spectrophotometer. Then the coating film was put in an oven at 50° C. for 7 days, followed by testing the b value, denoted as "$b_{Final}$". Delta b value, Δb, is determined by the equation: $\Delta b = b_{Final} - b_{Initial}$. Acceptable yellowing performance is delta b<0.5. The smaller delta b value, the less yellowing.

Synthesis of Binder-1

A monomer emulsion was prepared by combining BA (343.22 g), EHA (419.66 g), MMA (737.92 g), MAA (39 g), MEEU (20.28 g), deionized (DI) water (450 g), and RS-610-A25 surfactant (25%, 111.07 g), and emulsified with stirring. Then, FES 32 surfactant (30%, 7.8 g) and DI water (710 g) were charged to a five liter multi-neck flask fitted with mechanical stirring. The contents of the flask were heated to 84° C. under a nitrogen atmosphere. To the stirred flask, $Na_2CO_3$ (2.03 g) in DI water (33.82 g) were added, followed by the monomer emulsion (59.61 g), an aqueous solution of ferrous sulfate (0.01 g) mixed with EDTA sodium salt (0.03 g) in DI water (7.0 g), and then an aqueous solution of sodium persulfate (SPS) (4.68 g) in DI water (28.08 g). The remainder of the monomer emulsion, an aqueous solution of SBS (1.18 g) in DI water (102 g), and an aqueous solution of SPS (1.56 g) and $Na_2CO_3$ (4.21 g) in DI water (98 g) were added gradually to the flask over 90 minutes (min), while the flask temperature was maintained at 87° C. Then the vessel that containing the monomer emulsion and the feeding pipes leading into the flask were rinsed with DI water (56.16 g) and the rinse was added back to the flask. The reaction mixture was then cooled down to room temperature. During cooling the reaction mixture, aqueous solutions of t-butyl hydroperoxide (70%, 2.17 g) and SBS (1.45 g) in DI water were added into the flask. The obtained dispersion was neutralized to a certain pH with 8% NaOH solution and adjusted to the target solids content by DI water as given in Table 1.

Synthesis of Binder-2

A monomer emulsion was prepared by combining BA (916.11 g), MMA (552.8 g), AAEM (78.34 g), MAA (23.49 g), DI water (307.17 g), and LDBS 20 surfactant (21%, 52.80 g), and emulsified with stirring. Then, LDBS 20 surfactant (21%, 21.52 g) and DI water (972.04 g) were charged to a five liter multi-neck flask fitted with mechanical stirring. The materials in the flask were heated to 87° C. under a nitrogen atmosphere. To the stirred flask, $Na_2CO_3$ (4.69 g) in DI water (53.82 g) were added, followed by the monomer emulsion (69.56 g) and an aqueous solution of APS (4.68 g) in DI water (28.08 g). The remainder of the monomer emulsion was then added gradually to the flask over 65 min while the flask temperature was maintained at 87° C. Then, the vessel that containing the monomer emulsion and the feeding pipes leading into the flask were rinsed with DI water (37.44 g) and the rinse was added back to the flask. The reaction mixture was then cooled down to 65° C. Then, ferrous sulfate (0.01 g) mixed with EDTA sodium salt (0.01 g) in DI water (4 g) were added into the flask. During cooling the reaction mixture, aqueous solutions of t-butyl hydroperoxide (70%, 0.8 g) and SBS (0.8 g) in DI water were added into the flask. The obtained dispersion was neutralized to a certain pH with MEA and adjusted to the target solids content by DI water as given in Table 1.

Synthesis of Acetoacetamidoethyl Methacrylate (N-AAEM)

Methacrylic anhydride (107.1 g. 0.695 mol) was added slowly to a solution of N-(2-hydroxyethyl) acetoacetamide (77.6 g, 0.535 mol) in dry THF (200 mL). Then pyridine (42.3 g, 43 mL, 0.535 mol) was added slowly to the mixture while stirring at 0° C. The obtained yellow solution was stirred at 0° C. for 5 hours and then naturally raised to room temperature with stirring to complete the reaction. Thin layer chromatography (TLC) confirmed the completion of the reaction. After cooling the obtained mixture to 0° C., 450 mL HCl (1 M) was added slowly to the cooled mixture and stirred for a while. Then the organic layer was separated, washed with water (100 mL) twice, and dried with anhydrous sodium sulfate which was then removed by filtration. Butylated hydroxytoluene (BHT) (120 mg) was added to the resulting organic layer, which was then concentrated under reduced pressure at 25° C. The residue was purified by flash chromatography (silica gel columns; fluid phase: petroleum ether:ethyl acetate=1:1) to give a white solid (65 g, yield: 57%) with 300 ppm BHT. The structure of the obtained product (acetoacetamidoethyl methacrylate) was confirmed by $^1H$ nuclear magnetic resonance (NMR) spectroscopy with peaks having the following chemical shifts: 6.15 ppm, 5.60 ppm and 1.956 ppm (hydrogens on carbon-carbon double bond); 4.25 ppm and 3.59 ppm (hydrogens on methylene group connected oxygen or nitrogen); 3.435 ppm and 2.26 ppm (hydrogens on acetoacetate group).

Example (Ex) 1 Copolymer Additive

Firstly, an aqueous solution of monomers was prepared by mixing MEEU (112.5 g) and N-AAEM prepared above (12.5 g) with DI water (112.5 g). To a 500 mL reactor with a mechanical stirrer, a condenser, a thermometer and a nitrogen purging line, DI water (50 g) was added. When the reactor temperature was increased to 78° C., a promotor solution of ferrous sulfate (0.001 g) in DI water (0.48 g) was added into the reactor followed by SBS (0.95 g) in DI water (1.89 g). After 2 min, the aqueous solution of monomers obtained above, an aqueous solution of SPS (10%, 11.1 g) and an aqueous solution of SBS (40%, 32 g) were gradually added into the reactor over 90 min at 78° C. After completing the addition of these aqueous solutions, the reactor was cooled down to 65° C. and an aqueous solution of SPS (3%, 9.6 g) was added into the reactor to chase the residual monomers. Then, the reactor was cooled to room temperature. The obtained copolymer additive was neutralized with AMP-95 to a certain pH value as given in Table 1.

Exs 2-5 Copolymer Additives

Exs 2-5 were carried out according to the synthesis procedure in Ex 1 above, except the monomer compositions used are given in Table 1. The final pH values of the obtained copolymer additives were adjusted with AMP-95 to certain values as given in Table 1.

Comparative (Comp) Exs A-C Copolymer Additives

Comp Exs A-C were carried out according to the synthesis procedure in Ex 1 above, except the monomer compositions used are given in Table 1. The final pH values of the obtained copolymer additives were adjusted to 7 to 10 as given in Table 1.

Properties of the obtained copolymer additives above are given in Table 1. Hydrolysis stability of these copolymer additives were evaluated according to the test described above and delta acetone levels are given in Table 1. As shown in Table 1, all copolymer additives of Exs 1-5 demonstrated good hydrolysis stability, as indicated by delta acetone <400 ppm after heat aging at 80° C. for 1 day. In contrast, comparative copolymer additives of Comp Exs A-C prepared by using AAEM instead of N-AAEM showed unacceptable hydrolysis stability, as indicated by delta acetone after heat aging higher than 400 ppm.

TABLE 1

Compositions and properties of binders and copolymer additives

| | Monomer composition[1] | pH | Solids conent[2] (%) | Delta acetone[3] (ppm) | Mw[4] (g/mol) |
|---|---|---|---|---|---|
| Binder-1 (Fox Tg: −9° C.) | | 7.25 | 45.5 | N/A | 195916 |
| Binder-2 (Fox Tg: −10° C.) | | 9.0 | 48.5 | N/A | 1257630 |
| Comp Ex A copolymer additive | 5% AAEM/95% MEEU | 9.91 | 43.54 | 430 | 3093 |
| Comp Ex B copolymer additive | 20% AAEM/80% MEEU | 9.45 | 43.44 | 2122 | 3938 |
| Comp Ex C copolymer additive | 20% AAEM/80% MPEGMA 350 | 7.67 | 40.20 | 1536 | N/A |
| Ex 1 copolymer additive | 10% N-AAEM/90% MEEU | 8.3 | 42.31 | 44 | 5860 |
| Ex 2 copolymer additive | 5% N-AAEM/95% MEEU | 7.94 | 43.22 | 17 | 3597 |
| Ex 3 copolymer additive | 50% N-AAEM/50% MEEU | 7.9 | 42.84 | 308 | 4777 |
| Ex 4 copolymer additive | 20% N-AAEM/80% MEEU | 7.5 | 45.21 | 89 | 3341 |
| Ex 5 copolymer additive | 10% N-AAEM/90% MEEU | 3.5 | 44.44 | 50 | 3341 |

[1]by weight based on the total weight of monomers;
[2]solids content was determined as described above;
[3]Delta acetone after heat aging at 80° C. for 1 day, in ppm by weight based on the weight of the copolymer additive;
[4]Mw was measured by GPC described above.

Paints 1-5 and Comp Paints A-E Coating Compositions

The as prepared copolymer additives and binders were used in preparing coating compositions, Paint 1 and Comp Paints A and B, based on formulations given in Table 2. Ingredients in the grind stage were mixed using a high speed Cowles disperser at a speed of 1,000 revolutions per minute (rpm). Then ingredients in the letdown stage were added and mixed by a conventional agitator at a speed of 500 rpm to obtain the coating compositions.

The coating compositions of Paints 2-5 and Comp Paints C-E were prepared based on the same procedure as preparation of Paint 1 above, except the dosage and/or type of the copolymer additives used are given in Table 3 and water added to each coating composition was adjusted to make the total amount of each coating composition equal to 1,000 g.

Properties of the resulting coating compositions were evaluated according to the FA efficiency and yellowing test methods described above and results are given in Table 3.

TABLE 2

Coating compositions

| gram | Comp Paint A | Comp Paint B | Paint 1 |
|---|---|---|---|
| Grind | | | |
| Water | 116.2 | 116.2 | 116.2 |
| CELLOSIZE QP-15000-H | 2 | 2 | 2 |
| AMP-95 | 2 | 2 | 2 |
| Propylene glycol | 10 | 10 | 10 |

TABLE 2-continued

Coating compositions

| gram | Comp Paint A | Comp Paint B | Paint 1 |
|---|---|---|---|
| ECOSURF BD-109 surfactant | 2 | 2 | 2 |
| FOAMATER NXZ defoamer | 2 | 2 | 2 |
| OROTAN 1124 dispersant | 6 | 6 | 6 |
| Ti-Pure R-706 | 200 | 200 | 200 |
| CC-700 extender | 120 | 120 | 120 |
| DB-80 extender | 60 | 60 | 60 |
| ROCIMA 363 biocide | 2 | 2 | 2 |
| Grind Sub-Total | 522.2 | 522.2 | 522.2 |

TABLE 2-continued

Coating compositions

| gram | Comp Paint A | Comp Paint B | Paint 1 |
|---|---|---|---|
| Letdown | | | |
| Water | 70 | 70 | 70 |
| Binder-1 | 323 | | 323 |
| Binder-2 | | 300 | |
| Copolymer additive | | | 18.9 |
| Texanol | 8 | 8 | 8 |
| ROPAQUE Ultra E | 40 | 40 | 40 |
| FOAMATER NXZ defoamer | 1 | 1 | 1 |
| KATHON LXE 1.5% biocide | 1 | 1 | 1 |
| ACRYSOL RM-2020 NPR | 12 | 12 | 12 |
| Water | 22.8 | 45.8 | 3.9 |
| Total | 1000 | 1000 | 1000 |

As shown in Table 3, the coating compositions of Paints 1-5 comprising Exs 1-5 copolymer additives all provided FA efficiencies higher than 75%, which meet the FA requirement of JC/T1074-2008. Comp Paint A provided FA efficiency much lower than 75%. Comp Paint B comprising acetoacetoxy functional Binder-2 provided FA efficiency of 82%, however, demonstrated unacceptable yellowing performance after heat aging at 50° C. for 7 days (Δb=0.75). Comparing with Comp Paints A and B, Paints 1-5 provided the required FA efficiency without yellowing problems (Δb values<0.5). Comp Paints D and E comprising 0.2 wt % of copolymer additives of Comp Exs B and C, respectively, showed FA efficiencies lower than 75% which does not meet the requirement of JC/T 1074-2008. In contrast, Paint 4 containing the copolymer additive of Ex 4 at the same additive loading provided much higher FA efficiency (81.8%). Even when using the copolymer additive of Ex 3 at a low level of 0.08 wt %, the resulting Paint 3 still gave the FA efficiency of 75.1%, which meets the FA requirement. Comp Paint C containing 0.04 wt % of the copolymer additive of Ex 3 failed the JC/T 1074-2008 test. Paint 5 comprising 0.2 wt % of the copolymer additive of Ex 5 at a low pH (3.5) still provided FA efficiency as high as 90.6%, which indicates the inventive copolymer additive can be used at a low pH value while providing the high FA efficiency.

TABLE 3

Coating compositions and properties

| Sample | Main composition (Binder and additive) | Dosage of copolymer additive* | FA efficiency | Δb value (50° C./7 days) |
|---|---|---|---|---|
| Comp Paint A | Binder-1 without copolymer additive | 0 | 37.9% | 0.33 |
| Comp Paint B | Binder-2 without copolymer additive | 0 | 82% | 0.75 |
| Comp Paint C | Binder-1 + Ex 3 copolymer additive | 0.04 wt % | 66.1% | 0.35 |
| Comp Paint D | Binder-1 + Comp Ex B copolymer additive | 0.2 wt % | 73.8% | N/A |
| Comp Paint E | Binder-1 + Comp Ex C copolymer additive | 0.2 wt % | 72% | N/A |
| Paint 1 | Binder-1 + Ex 1 copolymer additive | 0.8 wt % | 91.9% | 0.31 |
| Paint 2 | Binder-1 + Ex 2 copolymer additive | 2.2 wt % | 81.1% | 0.31 |
| Paint 3 | Binder-1 + Ex 3 copolymer additive | 0.08 wt % | 75.1% | 0.36 |
| Paint 4 | Binder-1 + Ex 4 copolymer additive | 0.2 wt % | 81.8% | 0.41 |
| Paint 5 | Binder-1 + Ex 5 copolymer additive | 0.2 wt % | 90.6% | 0.39 |

*Wt % refers to the dry weight of copolymer additive relative to the total weight of the coating composition. "Dry weight" herein is calculated by the wet weight of a polymer additive multiply the solids content of this polymer additive.
N/A—not available.

What is claimed is:

1. A copolymer additive comprising a copolymer having a weight average molecular weight of from 1,000 to 10,000 g/mol and water, wherein the copolymer comprises, by weight based on the weight of the copolymer, from 4% to 60% of structural units of an acetoacetamide functional monomer having the structure of formula (I):

(I)

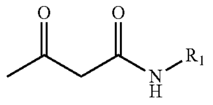

wherein $R_1$ is selected from the following structure:

(II-a)

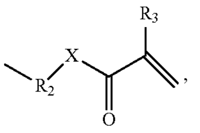

(II-b)

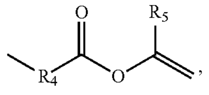

-continued (II-c)

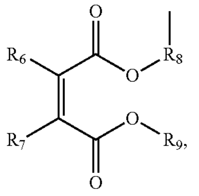

(II-d)

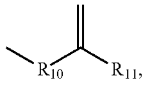 or

-continued (II-e)

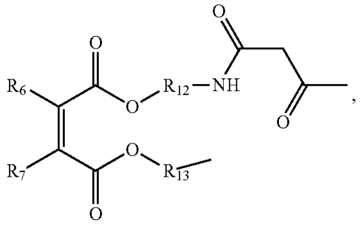

where $R_2$, $R_4$, $R_8$, $R_{10}$, $R_{12}$ and $R_{13}$ are each independently an alkylene group having 2 to 20 carbon atoms, $R_3$, $R_5$, $R_6$, $R_7$ and $R_{11}$ are each independently hydrogen or an alkyl group having from 1 to 8 carbon atoms, $R_9$ is hydrogen or an alkyl group having 1 to 20 carbon atoms, and X is —O— or —NH—; and from 40% to 96% of structural units of a ureido monomer.

2. The copolymer additive of claim 1, wherein the acetoacetamide functional monomer is an acetoacetamidoalkyl (meth)acrylate.

3. The copolymer additive of claim 1, wherein the acetoacetamide functional monomer is selected from the group consisting of acetoacetamidoethyl methacrylate, acetoacetamidoethyl acrylate, acetoacetamidoethyl (meth) acrylamide, acetoacetamidoethyl maleate, or mixtures thereof.

4. The copolymer additive of claim 1, wherein the ureido monomer is selected from the group consisting of

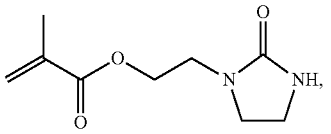

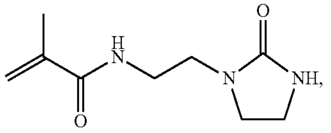

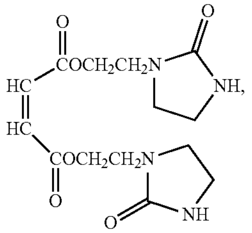

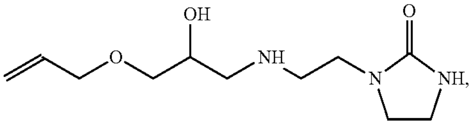

or mixtures thereof.

5. The copolymer additive of claim 1, wherein the copolymer comprises, by weight based on the weight of the copolymer, from 8% to 25% of structural units of the acetoacetamide functional monomer, and from 75% to 92% of structural units of the ureido monomer.

6. The copolymer additive of claim 1, wherein the copolymer has a weight average molecular weight of from 2,000 to 7,000 g/mol.

7. The copolymer additive of claim 1, having a pH value of 2 to 10.

8. A coating composition comprising:

a binder having a weight average molecular weight of 100,000 g/mol or more, and from 0.08% to 3% by dry weight of the copolymer additive of claim 1, based on the total weight of the coating composition.

9. The coating composition of claim 8, wherein the binder comprises an acrylic homopolymer, a styrene-acrylic copolymer, a vinyl acetate-acrylic copolymer, or mixtures thereof.

10. The coating composition of claim 8, comprising from 0.15% to 2.2% by dry weight of the copolymer additive, based on the total weight of the coating composition.

11. The coating composition of any one of claim 8, wherein the coating composition comprises, by weight based on the total weight of the coating composition, from 0.04% to 0.4% of structural units of the acetoacetamide functional monomer.

* * * * *